United States Patent
Dai et al.

(10) Patent No.: US 10,844,170 B2
(45) Date of Patent: Nov. 24, 2020

(54) PHOSPHORUS-NITROGEN-SILICON-CONTAINING POLYMERIC FLAME RETARDANT AND PREPARATION METHOD AND APPLICATION THEREOF

(71) Applicant: XIAMEN UNIVERSITY, Xiamen (CN)

(72) Inventors: Lizong Dai, Xiamen (CN); Ting Chen, Xiamen (CN); Cheng Liu, Xiamen (CN); Shicheng Wang, Xiamen (CN); Guorong Cehn, Xiamen (CN); Conghui Yuan, Xiamen (CN); Yiting Xu, Xiamen (CN); Birong Zeng, Xiamen (CN); Wei'ang Luo, Xiamen (CN)

(73) Assignee: XIAMEN UNIVERSITY, Xiamen (CN)

( * ) Notice: Subject to any disclaimer, the term of this patent is extended or adjusted under 35 U.S.C. 154(b) by 21 days.

(21) Appl. No.: 16/463,716

(22) PCT Filed: Nov. 23, 2017

(86) PCT No.: PCT/CN2017/112580
§ 371 (c)(1),
(2) Date: May 23, 2019

(87) PCT Pub. No.: WO2018/095358
PCT Pub. Date: May 31, 2018

(65) Prior Publication Data
US 2019/0276599 A1    Sep. 12, 2019

(30) Foreign Application Priority Data
Nov. 23, 2016    (CN) .......................... 2016 1 1037090

(51) Int. Cl.
*C08G 65/26* (2006.01)
*B29C 39/00* (2006.01)
(Continued)

(52) U.S. Cl.
CPC ........ *C08G 65/2639* (2013.01); *B29C 39/003* (2013.01); *B29C 39/38* (2013.01);
(Continued)

(58) Field of Classification Search
CPC   C08G 65/22; C08G 65/2618; C08G 65/2621; C08G 65/2624; C08G 65/2639;
(Continued)

(56) References Cited

FOREIGN PATENT DOCUMENTS

| CN | 103755742 A | 4/2014 |
|---|---|---|
| CN | 103819634 A | 5/2014 |

(Continued)

*Primary Examiner* — Kregg T Brooks
(74) *Attorney, Agent, or Firm* — Cooper Legal Group, LLC

(57) ABSTRACT

Disclosed are a preparation method of a phosphorus-nitrogen-silicon-containing polymeric flame retardant and appli-
(Continued)

cation thereof. The chemical structure of the polymeric flame retardant is

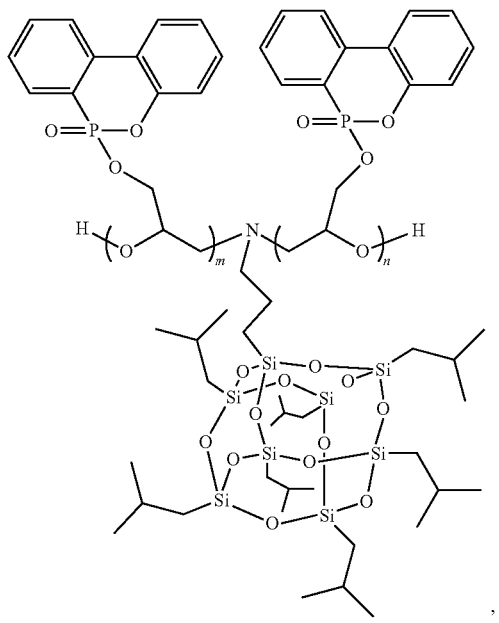

wherein m=10~100, n=10~100. The synergistic flame-retardant effect between the phosphorus, nitrogen, and silicon in the phosphorus-nitrogen-silicon-containing polymeric flame retardant increases the flame retardancy of epoxy resin.

8 Claims, 1 Drawing Sheet

(51) Int. Cl.
| | | |
|---|---|---|
| *B29C 39/38* | (2006.01) | |
| *C08G 59/22* | (2006.01) | |
| *C08G 59/24* | (2006.01) | |
| *C08G 59/50* | (2006.01) | |
| *C08L 63/00* | (2006.01) | |
| *C08G 65/22* | (2006.01) | |
| *C08G 65/336* | (2006.01) | |
| *B29K 63/00* | (2006.01) | |
| *B29K 105/00* | (2006.01) | |

(52) U.S. Cl.
CPC ......... *C08G 59/223* (2013.01); *C08G 59/245* (2013.01); *C08G 59/5033* (2013.01); *C08G 65/22* (2013.01); *C08G 65/2624* (2013.01); *C08G 65/336* (2013.01); *C08L 63/00* (2013.01); *B29K 2063/00* (2013.01); *B29K 2105/0026* (2013.01); *B29K 2905/02* (2013.01); *C08L 2201/02* (2013.01); *C08L 2201/08* (2013.01)

(58) Field of Classification Search
CPC ....... C08G 65/336; C08L 71/00; C08L 63/00; C08L 2201/02; C08L 2201/08; C08K 5/006

See application file for complete search history.

(56) References Cited

FOREIGN PATENT DOCUMENTS

| CN | 104262538 A | 1/2015 |
| CN | 104817685 A | 8/2015 |
| CN | 104845049 A | 8/2015 |

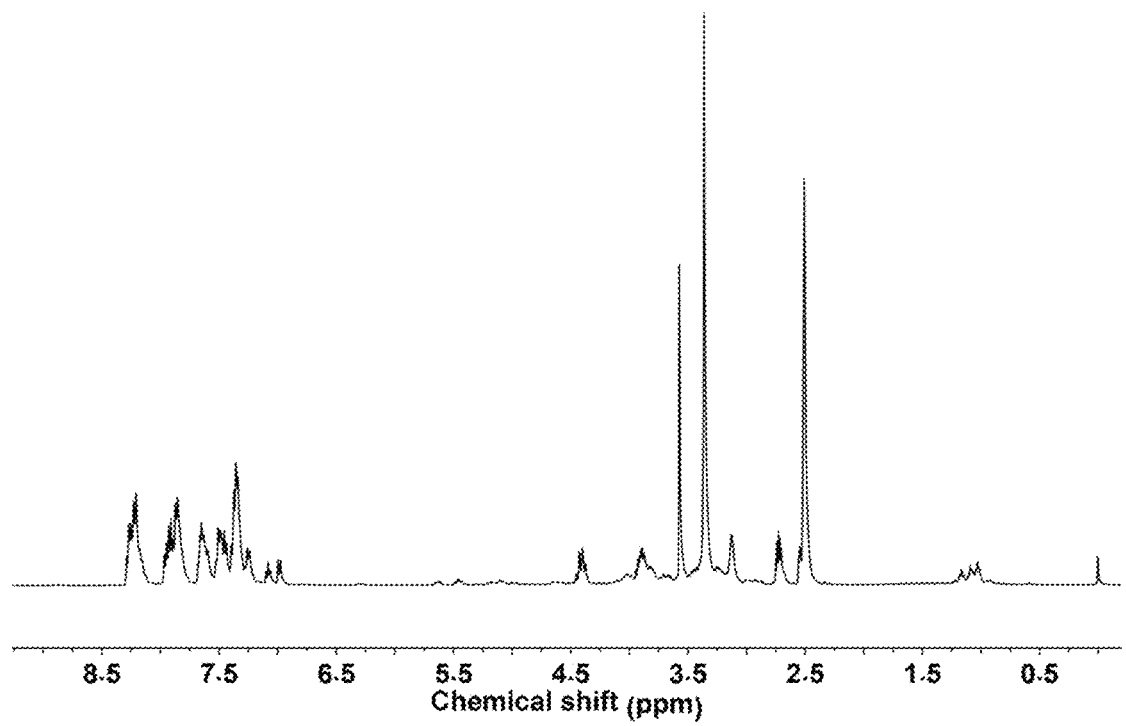

PHOSPHORUS-NITROGEN-SILICON-CONTAINING POLYMERIC FLAME RETARDANT AND PREPARATION METHOD AND APPLICATION THEREOF

TECHNICAL FIELD

The invention belongs to the technical field of organic flame retardant, in particular to a phosphorus-nitrogen-silicon-containing polymeric flame retardant and preparation method and application thereof.

BACKGROUND ART

Epoxy resin is a kind of polymer material with the advantages of high strength, excellent binding performance, corrosion resistance and dielectric properties. It is widely used in civil construction, electronics, aerospace and automotive machinery and other fields, and plays an indispensable role in various sectors of the national economy. However, the relatively flammability of the epoxy resin has greatly limits its application. The flame retardant modification of epoxy resin has also been a challenging subject that researchers have been discussed unremittingly.

Multi-element flame retardant is a kind of flame retardant rising in recent years. CN201510132367.3 disclosed an expanded flame retardant containing phosphorus and nitrogen. As an epoxy resin reactive flame retardant curing agent, it not only has flame retardant effect, but also can cure epoxy resin with good mechanical properties. CN201510132367.3 disclosed a DOPO-derived flame retardant, which had phosphorus and nitrogen synergistic flame retardant effect and a better thermal stabilization and good charring effect. It was used in flame retardant of epoxy resin and other polymer materials. With its good flame retardant performance, and the application scope of the DOPO flame retardant is expanded. Multi-element flame retardant has good effect of flame retardancy, but most of the existing flame retardants are mainly small molecules, which tend to have the shortcomings of reducing thermal stability or mechanical properties.

SUMMARY OF THE INVENTION

The object of the present invention is to provide a preparation method of the phosphorus-nitrogen-silicon-containing polymeric flame retardant.

Another object of the present invention is to provide an application of the phosphorus-nitrogen-silicon-containing polymeric flame retardant.

The technical scheme provided by the invention is as follows:

A phosphorus-nitrogen-silicon-containing polymeric flame retardant with a chemical formula structure of:

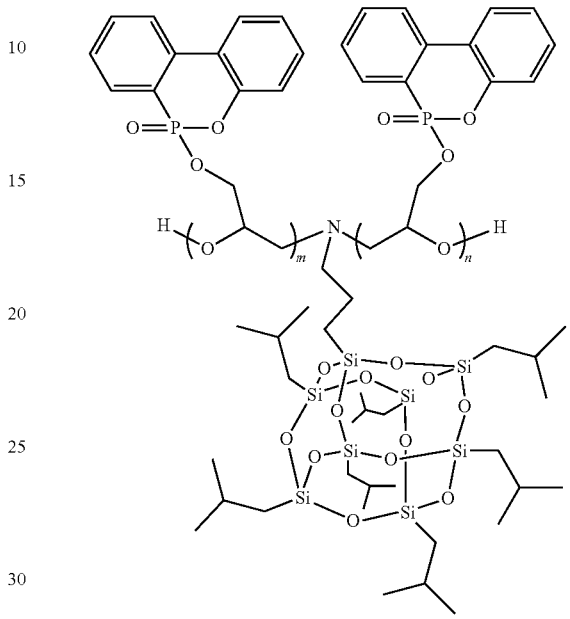

wherein m=10~100, n=10~100.

The preparation method of the phosphorus-nitrogen-silicon-containing polymeric flame retardant described above is as follows:

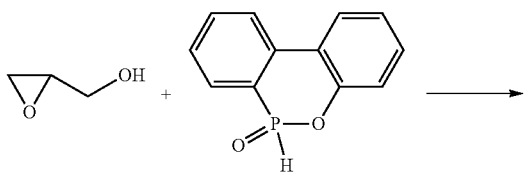

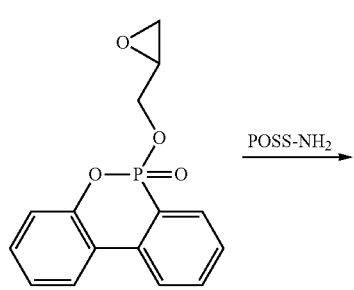

-continued

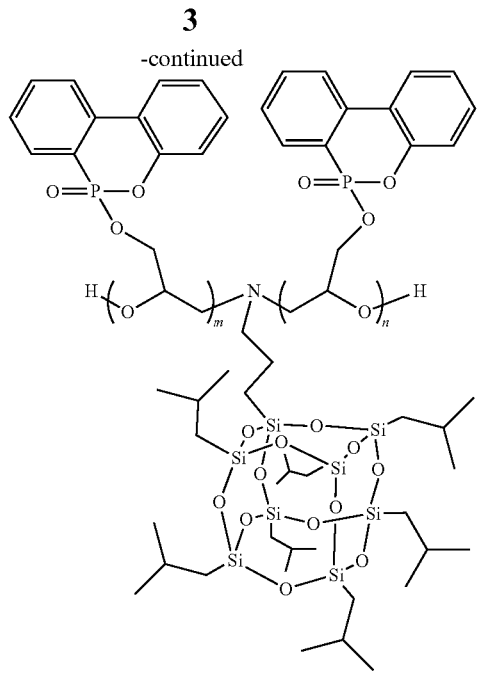

The detailed steps are described as follows:

(1) Glycidol, 9, 10-dihydro-9-oxa-10-phosphaphenanthrene-10-oxide (DOPO), triethylamine and a first organic solvent are added to the reaction vessel in turn under ice bath. The reaction is carried out at room temperature for 4~16 hours, then it is repeatedly extracted and washed with water, the organic phase is dried with anhydrous magnesium sulfate and treated with vacuum filter. Finally the phosphorus-containing epoxy monomer EP-DOPO is obtained after the solvent is removed by rotary evaporation. The molar ratio of the glycidol, DOPO and triethylamine is 1:0.5~2.5: 0.5~2.5.

(2) The phosphorus-containing epoxy monomer EP-DOPO obtained in step (1), aminopropyl polyhedral oligomeric silsesquioxane (POSS—$NH_2$), sodium methanol and a second organic solvent are added to another reaction vessel in turn, heated to 60~120° C., protected by nitrogen, and reacted for 4-24 hours. Then the filter cake is obtained by methanol precipitation, the filter cake is washed with methanol, and the white solid obtained is dried in the vacuum drying box at 60° C. for 24 hours, thus the phosphorus-nitrogen-silicon-containing polymeric flame retardant is obtained. The molar ratios of EP-DOPO, aminopropyl polyhedral oligomeric silsesquioxane and sodium methanol are 1:0.01~0.1:0.01~0.1.

In a preferred embodiment of the present invention, the first organic solvent is dichloromethane, toluene or carbon tetrachloride.

In a preferred implementation of the present invention, the second organic solvent is toluene, N, N-dimethylformamide or 1,4-dioxane.

The application of the phosphorus-nitrogen-silicon-containing polymeric flame retardant is in the preparation of flame retardant epoxy resin.

In a preferred embodiment of the present invention, the specific is: the epoxy resin prepolymer is taken and heated to 70~110° C. and 0.1~50 wt % phosphorus-nitrogen-silicon-containing polymeric flame retardant is added, it is stirred until the mixture is uniformly transparent. A curing agent 4,4'-diaminodiphenylmethane (DDM) was added according to stoichiometric ratio until it is completely dissolved, poured into an aluminium mold, then a curing procedure is set to cure the mixture and the flame retardant epoxy resin is obtained.

Further preferably, the epoxy resin prepolymer is E51 bisphenol A epoxy resin.

Further preferably, the mass ratio of the epoxy resin prepolymer to the curing agent 4,4'-diaminodiphenylmethane is 8:2.02.

Further preferably, the curing procedure is as follows: 120° C. for 4 h, 140° C. for 2 h and 180° C. for 2 h.

The beneficial effects of the present invention are listed as follows:

1. The present invention provided a preparation method of phosphorus-nitrogen-silicon integrated polymeric flame retardant by ring-opening reaction of phosphorus-containing epoxy monomer using POSS—$NH_2$ as an initiator. Compared with small molecular-type flame retardants, polymeric flame retardants normally have better compatibility with polymer matrix. Due to the large amount of —C—O— bonds in the polymer molecular chain, the polymer molecular chain is flexible, which further improves the compatibility of the flame retardant with the polymer matrix. Meanwhile, thermal stability and mechanical properties of flame retardancy epoxy resin are improved after curing.

2. The aminopropyl polyhedral oligomeric silsesquioxane (POSS—$NH_2$) used in the present invention is a molecular level organic/inorganic intramolecular hybrid system, and its core is a cage-shaped inorganic skeleton composed of silicon oxide. Compared with the traditional linear siloxane modification system, POSS—$NH_2$ has better stability at high temperature, and its nano-size effect is helpful in improving the thermal stability, oxidation resistance and the mechanical properties of the material.

3. The phosphorus-nitrogen-silicon-containing polymeric flame retardant of the present invention is prepared by the combination of 9, 10-dihydro-9-oxa-10-phosphaphenanthrene-10-oxide (DOPO) and aminopropyl polyhedral oligomeric silsesquioxane (POSS—$NH_2$). DOPO has good solubility in epoxy resin while POSS—$NH_2$ has poor solubility in epoxy resin, which causes the self-assembly phenomenon of flame retardant in epoxy resin by a nanostructure with POSS as a core and DOPO as a shell, the self-assembled flame retardant has a nano-enhancing effect to the matrix material.

4. The synergistic flame-retardant effect between the phosphorus, nitrogen, and silicon in the phosphorus-nitrogen-silicon-containing polymeric flame retardant increases the flame retardancy of epoxy resin.

5. The molecular weight of the phosphorus-nitrogen-silicon-containing polymeric flame retardant can be controlled, and the content ratio of phosphorus, nitrogen and silicon in the system can be controlled by adjusting the molecular weight of the polymer.

6. The preparation method of the invention has the advantages of simpler synthesis reaction, lower cost of raw materials and higher yield of products.

DRAWINGS

The sole FIGURE shows the $^1$H NMR spectrum of phosphorus-nitrogen-silicon-containing polymeric flame retardant in embodiment 1.

DETAILED DESCRIPTION

The following is a further description of the technical schemes of the present invention through specific embodiments in conjunction with the accompanying drawings.

In the embodiments described below, the epoxy resin prepolymer is E51 bisphenol A epoxy resin.

Embodiment 1

(1) 2.88 g (38.89 mmol) of glycidol, 7 g (32.41 mmol) of DOPO, 3.94 g (38.89 mmol) triethylamine and 50 mL of dichloromethane were added to the single mouth bottle in turn under ice bath, and the reaction was carried out at room temperature for 8 h. Then the solution was repeatedly extracted and washed with water, the organic phase was dried with anhydrous magnesium sulfate and vacuum filtered. Finally, the solvent was removed by rotary evaporation to obtain the monomer EP-DOPO.

(2) 5.72 g (19.86 mmol) of the monomer EP-DOPO obtained in the step (1), 0.35 g (0.40 mmol) of POSS—$NH_2$, 0.01 g (0.20 mmol) of sodium methanol and 30 mL of N,N-dimethylformamide were sequentially added to the two-necked bottle, heated to 80° C., under the protection of nitrogen, the reaction was carried out for 12 h. Then, the filter cake was obtained by methanol precipitation, and the filter cake was washed with methanol, the phosphorus-nitrogen-silicon-containing polymeric flame retardant was obtained as white solid after drying in the vacuum drying chamber at 60° C. for 24 hours (as shown in the sole FIGURE).

(3) 20 g of epoxy resin prepolymer was heated to 70° C. 1.32 g of phosphorus-nitrogen-silicon-containing polymeric flame retardant was added, stirred until the mixture was uniformly transparent. Then 5.05 g of 4, 4'-diaminodiphenylmethane (DDM) was added until it was completely dissolved, the mixture was poured into the aluminum mold, then a curing procedure was set to cure the mixture and the flame retardant epoxy resin was obtained.

According to GB/T 2406-2009, the oxygen index of the flame retardant epoxy resin is 28.1%.

Embodiment 2

(1) 2.88 g (38.89 mmol) of glycidol, 7 g (32.41 mmol) of DOPO, 3.94 g (38.89 mmol) triethylamine and 50 mL of dichloromethane were added to the single mouth bottle in turn under ice bath, and the reaction was carried out for 8 h. Then the solution was repeatedly extracted and washed with water, the organic phase was dried with anhydrous magnesium sulfate and vacuum filtered. Finally, the solvent was removed by rotary evaporation to obtain the monomer EP-DOPO.

(2) 5.72 g (19.86 mmol) of the monomer EP-DOPO obtained in the step (1), 0.35 g (0.40 mmol) of POSS—$NH_2$, 0.01 g (0.20 mmol) of sodium methanol and 30 mL of N,N-dimethylformamide were sequentially added to the two-necked bottle, heated to 80° C. under the protection of nitrogen, the reaction was carried out for 12 h. Then, the filter cake was obtained by methanol precipitation, and the filter cake was washed with methanol, the phosphorus-nitrogen-silicon-containing polymeric flame retardant was obtained as white solid after drying in the vacuum drying chamber at 60° C. for 24 hours.

(3) 20 g of epoxy resin prepolymer was heated to 70° C., 0.61 g of phosphorus-nitrogen-silicon-containing polymeric flame retardant was added, stirred until the mixture was uniformly transparent. Then 5.05 g of 4, 4'-diaminodiphenylmethane (DDM) was added until it was completely dissolved; the mixture was poured into the aluminum mold, then a curing procedure was set to cure the mixture and the flame retardant epoxy resin was obtained.

According to GB/T 2406-2009, the oxygen index of the flame retardant epoxy resin is 27.5%.

Embodiment 3

(1) 2.88 g (38.89 mmol) of glycidol, 7 g (32.41 mmol) of DOPO, 3.94 g (38.89 mmol) triethylamine and 50 mL of dichloromethane were added to the single mouth bottle in turn under ice bath, and the reaction was carried out for 8 h. Then the solution was repeatedly extracted and washed with water, the organic phase was dried with anhydrous magnesium sulfate and vacuum filtered. Finally, the solvent was removed by rotary evaporation to obtain the monomer EP-DOPO.

(2) 5.72 g (19.86 mmol) of the monomer EP-DOPO obtained in the step (1), 0.35 g (0.40 mmol) of POSS—$NH_2$, 0.01 g (0.20 mmol) of sodium methanol and 30 mL of N,N-dimethylformamide were sequentially added to the two-necked bottle, heated to 80° C. under protection of nitrogen, the reaction was carried out for 12 h. Then, the filter cake was obtained by methanol precipitation, and the filter cake was washed with methanol, the phosphorus-nitrogen-silicon-containing polymeric flame retardant was obtained as white solid after drying in the vacuum drying chamber at 60° C. for 24 hours.

(3) 20 g of epoxy resin prepolymer was heated to 70° C., 1.88 g of phosphorus-nitrogen-silicon-containing polymeric flame retardant was added, stirred until the mixture was uniformly transparent. Then 5.05 g of 4, 4'-diaminodiphenylmethane (DDM) was added until it was completely dissolved, the mixture was poured into the aluminum mold, then a curing procedure was set to cure the mixture and the flame retardant epoxy resin was obtained.

According to GB/T 2406-2009, the oxygen index of the flame retardant epoxy resin is 28.8%.

Embodiment 4

(1) 2.88 g (38.89 mmol) of glycidol, 8 g (37.04 mmol) of DOPO, 3.94 g (38.89 mmol) of triethylamine and 50 mL of toluene were added to a single mouth bottle in turn under ice bath, reacted for 2 h. Then the solution was extracted and washed with water for three times, the organic phase was dried with anhydrous magnesium sulfate and vacuum filtered. Finally, the solvent was removed by rotary evaporation to obtain the monomer EP-DOPO.

(2) 5.72 g (19.86 mmol) of the monomer EP-DOPO obtained in the step (1), 0.35 g (0.40 mmol) of POSS—$NH_2$, 0.01 g (0.20 mmol) of sodium methanol and 30 mL of toluene were sequentially added to the two-necked bottle, heated to 80° C. under protection of nitrogen, the reaction was carried out for 12 h. Then, the filter cake was obtained by methanol precipitation, and the filter cake was washed with methanol, the phosphorus-nitrogen-silicon-containing polymeric flame retardant was obtained as white solid after drying in the vacuum drying chamber at 60° C. for 24 hours.

(3) 20 g of epoxy resin prepolymer was heated to 70° C. 1.32 g of phosphorus-nitrogen-silicon-containing polymeric flame retardant was added, stirred until the mixture was uniformly transparent. Then 5.05 g of 4, 4'-diaminodiphenylmethane (DDM) was added until it was completely dissolved, then poured into the aluminum mold, then a curing procedure was set to cure the mixture and the flame retardant epoxy resin was obtained.

According to GB/T 2406-2009, the oxygen index of the flame retardant epoxy resin is 28.3%.

Embodiment 5

(1) 2.88 g (38.89 mmol) of glycidol, 7 g (32.41 mmol) of DOPO, 3.94 g (38.89 mmol) triethylamine and 50 mL of dichloromethane were added to the single mouth bottle in turn under ice bath, and the reaction was carried out for 8 h. Then the solution was repeatedly extracted and washed with water, the organic phase was dried with anhydrous magnesium sulfate and vacuum filtered. Finally, the solvent was removed by rotary evaporation to obtain the monomer EP-DOPO.

(2) 5.72 g (19.86 mmol) of the monomer EP-DOPO obtained in the step (1), 0.70 g (0.80 mmol) of POSS—NH$_2$, 0.02 g (0.40 mmol) of sodium methanol and 30 mL of N,N-dimethylformamide were sequentially added to the two-necked bottle, heated to 80° C. under protection of nitrogen, the reaction was carried out for 12 h. Then, the filter cake was obtained by methanol precipitation, and the filter cake was washed with methanol, the phosphorus-nitrogen-silicon-containing polymeric flame retardant was obtained as white solid obtained after drying in the vacuum drying chamber at 60° C. for 24 hours.

(3) 20 g of epoxy resin prepolymer was heated to 70° C. 1.32 g of phosphorus-nitrogen-silicon-containing polymeric flame retardant was added, stirred until the mixture was uniformly transparent. Then 5.05 g of 4, 4'-diaminodiphenylmethane (DDM) was added until it was completely dissolved, then poured into the aluminum mold, then a curing procedure was set to cure the mixture and the flame retardant epoxy resin was obtained.

According to GB/T 2406-2009, the oxygen index of the flame retardant epoxy resin is 28.2%.

It is known to those skilled in the field that the technical scheme of the present invention can still achieve the same or similar technical effect as the above-mentioned embodiments when it changes in the following range, and still belongs to the scope of protection of the present invention:

As mentioned above, these are only preferred embodiments of the present invention, so the scope of implementation of the present invention cannot be limited accordingly. That is, the equivalent changes and modifications made according to the patent scope and description content of the present invention should still be within the scope of the present invention.

The invention claimed is:

1. A preparation method of a phosphorus-nitrogen-silicon-containing polymeric flame retardant, wherein: the synthetic route is as follows:

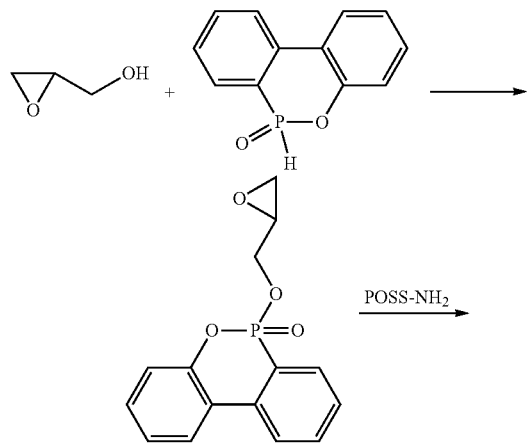

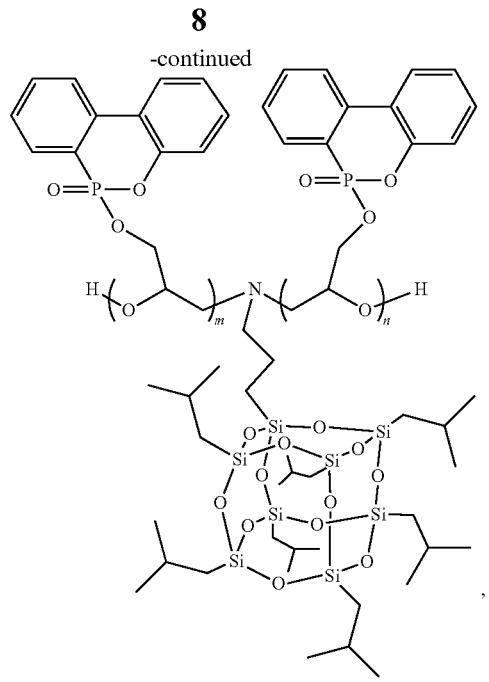

where m=10~100, n=10~100;

the detailed steps are described as follows:
(1) glycidol, 9,10-dihydro-9-oxa-10-phosphaphenanthrene-10-oxide (DOPO), triethylamine and a first organic solvent are added to the reaction vessel in turn under ice bath, the reaction is carried out at room temperature for 4~16 hours, then it is repeatedly extracted and washed with water, the organic phase is dried with anhydrous magnesium sulfate and vacuum filtered, finally the phosphorus-containing epoxy monomer EP-DOPO is obtained after the solvent is removed by rotary evaporation, the molar ratio of the glycidol, DOPO and triethylamine is 1:0.5~2.5:0.5~2.5;
(2) the phosphorus-containing epoxy monomer EP-DOPO obtained in step (1), aminopropyl polyhedral oligomeric silsesquioxane (POSS—NH$_2$), sodium methanol and a second organic solvent are added to another reaction vessel in turn, heated to 60~120° C. under protection of nitrogen, and reacted for 4~24 hours, then the filter cake is obtained by methanol precipitation, the filter cake is washed with methanol, and the white solid obtained is dried in the vacuum drying box at 60° C. for 24 hours, thus the phosphorus-nitrogen-silicon-containing polymeric flame retardant is obtained, the molar ratios of the EP-DOPO, aminopropyl polyhedral oligomeric silsesquioxane and sodium methanol are 1:0.01~0.1:0.01~0.1.

2. The preparation method according to claim 1, wherein the first organic solvent is dichloromethane, toluene or carbon tetrachloride.

3. The preparation method according to claim 1, wherein the second organic solvent is toluene, N, N-dimethylformamide or 1,4-dioxane.

4. A flame retardant epoxy resin comprising the phosphorus-nitrogen-silicon-containing polymeric flame retardant prepared according to the method of claim 1.

5. The epoxy resin according to claim 4, wherein: an epoxy resin prepolymer is taken and heated to 70~110° C. and 0.1~50 wt % phosphorus-nitrogen-silicon-containing polymeric flame retardant is added, and stirred until the mixture is uniformly transparent, a curing agent 4,4'-diaminodiphenylmethane (DDM) is added according to stoichiometric ratio until it is completely dissolved, poured into an aluminium mold, then a curing procedure was set to cure the mixture and the flame retardant epoxy resin was obtained.

6. The epoxy resin according to claim 5, wherein: the epoxy resin prepolymer is bisphenol A epoxy resin.

7. The epoxy resin according to claim 5, wherein: the mass ratio of the epoxy resin prepolymer to the curing agent 4,4'-diaminodiphenylmethane is 8:2.02.

8. The epoxy resin according to claim 5, wherein: the curing procedure is: 120° C. for 4 h, 140° C. for 2 h and 180° C. for 2 h.

* * * * *